(No Model.)

G. G. CROWLEY.
HARVESTER.

Patented Jan. 22, 1884.

Fig. 1.

WITNESSES
Wm A. Skinkle
Edwin A. Newman

INVENTOR
George G. Crowley,
By his Attorneys
Baldwin, Hopkins & Peyton (No Model.) 5 Sheets—Sheet 3.

G. G. CROWLEY.
HARVESTER.

No. 292,209. Patented Jan. 22. 1884.

Fig. 3.

WITNESSES
Wm A. Skinkle
Edwin A. Newman

INVENTOR
George G. Crowley
By his Attorneys (No Model.)  
5 Sheets—Sheet 4.

G. G. CROWLEY.
HARVESTER.

No. 292,209. Patented Jan. 22, 1884.

WITNESSES  
Wm A. Skinkle.  
Edwin A. Newman.

INVENTOR  
George G. Crowley.  
By his Attorneys

(No Model.) 5 Sheets—Sheet 5.

G. G. CROWLEY.
HARVESTER.

No. 292,209. Patented Jan. 22, 1884.

WITNESSES
Wm. A. Skinkle
Edwin A. Newman.

INVENTOR
George G. Crowley.
By his Attorneys
Baldwin, Hopkins & Peyton

UNITED STATES PATENT OFFICE.

GEORGE G. CROWLEY, OF LITTLE FALLS, NEW YORK.

HARVESTER.

SPECIFICATION forming part of Letters Patent No. 292,209, dated January 22, 1884.

Application filed March 30, 1883. (No model.)

*To all whom it may concern:*

Be it known that I, GEORGE G. CROWLEY, of Little Falls, in the county of Herkimer and State of New York, have invented certain new and useful Improvements in Harvesters, of which the following is a specification.

My invention relates to improvements applicable to harvesters of the class having continuously-rotating rising-and-falling combined rakes and reels of the type in which the rake-heads are capable of oscillating about their longitudinal axes, and are controlled in such manner that the rake-teeth, after reeling in the grain, may be caused to rock up to pass clear of cut grain upon the platform or be held down to sweep the grain in gavels from the platform. A machine of this type is shown by United States Letters Patent, No. 263,383, dated August 29, 1882.

My objects, mainly, are to provide improved rake setting or controlling mechanism, by adjustment of which to predetermine the action of the rakes by causing their teeth to act automatically upon the grain on the platform at longer or shorter intervals, according to the character of the crop, and to provide for throwing any desired rake into action sooner or later than its turn of automatic action without varying the regularly-recurring interval in the action of the other rakes, the interval between the action of a thrown-in or intervening rake (whether its action be hastened or retarded) and that of the following automatically-actuated rake being the same as that between the action of any two successively and automatically operated rakes; or, in other words, the only variation in the regular order of operation is to shorten or lengthen the interval in the discharge of gavels by correspondingly shortening or lengthening the interval between the action of the thrown-in rake and that of the rake operated next in advance of it, and this whether said preceding rake shall have been operated regularly and automatically or out of its turn.

My improvements, as will hereinafter be distinctly claimed, involve certain features of novel construction and sundry combinations of devices, among which may be mentioned the rake-controlling cam, means for supporting the rake-heads on their short carrying-arms and for rocking them, means by which the rake-heads may be set for automatic action for reeling only and be controlled by the actuation of tripping mechanism at the will of the driver of the machine to throw the rakes into action, and, as above referred to, rake adjusting and controlling mechanism by which to predetermine the automatic action of the rakes while admitting of a rake being thrown into action in advance of its turn, or held out of action until after its turn, without varying the predetermined interval between its action and that of the automatically-operated rake next following.

The accompanying drawings represent only such parts as are required to illustrate an appropriate application of my improvements to a suitable machine—such, for instance, in some respects as that in part shown by the above-referred to Patent No. 263,383; but the requisite old features of a fully-organized machine may be of any desired and proper construction, and some of my improvements may be used without the others.

Figs. 6 to 15, inclusive, are detail views, on an enlarged scale, of the adjustable rake-controlling mechanism. Of these views

Figure 3:
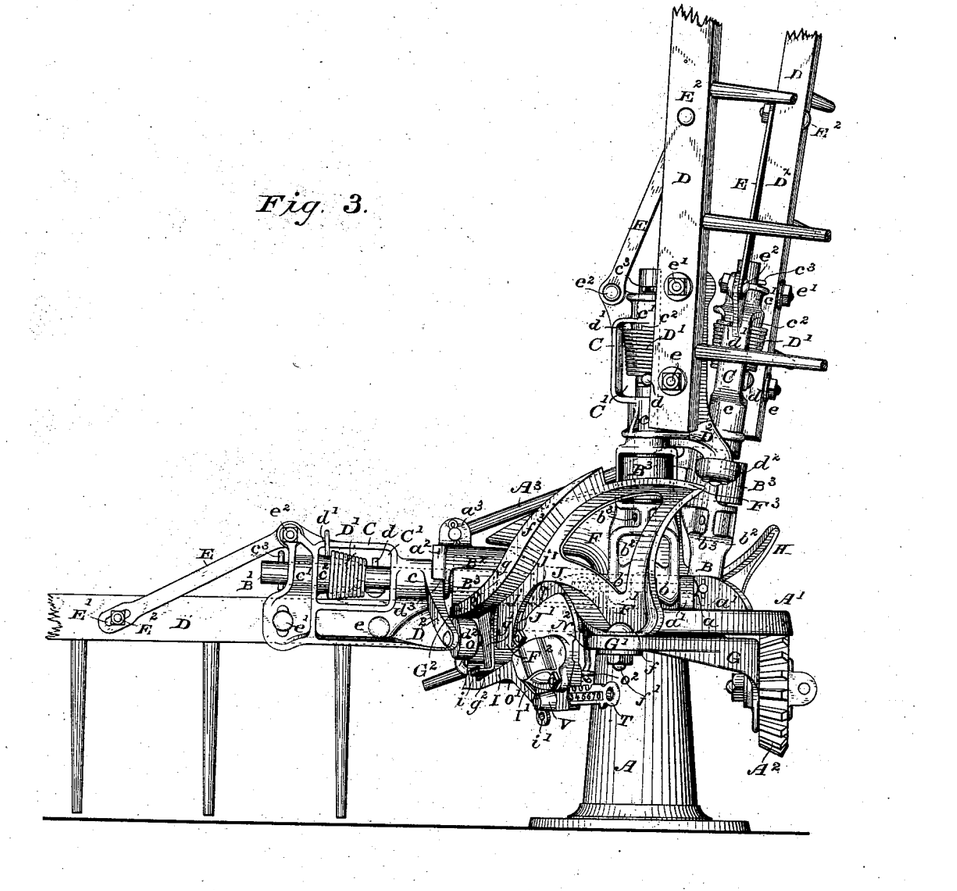
Fig. 3 is a front elevation.

A hollow rake post or standard, A, supports at its top a rotary rake-carrier or inverted crown-wheel, A', actuated by a pinion, A², in well-known way. The rake-post is cast with an overhanging top portion or head, further on in detail referred to, and is suitably secured upon the heel of the finger-beam or inner front corner of the platform. Short rake-carrying arms, in this instance of the two-part type, have pivotal connection with the rake-carrier A' by means of the usually-employed pivots $a$ and lugs or ears $a'$ $a'$. Each of said rake-carrying arms is constructed in two sections, as follows: The inner or heel section, B, is provided at one end, as best shown in Fig. 3, with perforated lugs $b$ $b$ for the pivot-pin $a$, and at its opposite end or head, $b'$, is perforated longitudinally to receive the round rod B', constituting the outer section. A second perforation, in line with that in the head $b'$, is made in the section B, near its inner end, centrally through the shoulder $b^2$, to receive the inner end of the rod B'. A rivet, $b^3$, or, if preferred, a more readily removable cross-pin, passes through the shoulder $b^2$, and through the rod B', and thus rigidly unites the two sections of the rake-carrying arm. Between the outer end or head $b'$ and the shoulder $b^2$ of the perforated section it is formed with the curved and recessed lateral bulge or upward projection, B², which partially incloses and serves to protect a roller, B³, mounted to rotate about the rod B'. The open under side of the nearly semicircular recessed projection B² leaves exposed enough of the roller to bear upon the cam-track, as will further on be made apparent, while affording considerable protection to the roller and guarding against clogging or entanglement therewith of stalks of grain. A slight projection or shoulder, $a^2$, is provided at the outer end of the section B, to act as a stop to limit the swing of an oscillating bracket on the rod B', as further on to be described, and perforated lugs $a^3$ on top of the sections B serve, with connecting-rods A³, to link the rake-arms together in pairs, as usual.

The oscillating brackets C are each firmly connected with a rake-arm, D, and formed with two bearing-perforations, one through the inner end at $c$, and the other through the outer end at $c'$. The rods B' of the rake-carrying arms fit in the bearings of the brackets so that the brackets may be oscillated about them. The brackets are of centrally-open form, being each constructed with the opening C' between the bearings $c$ $c'$. The outer bearing, $c'$, is formed with the inwardly-extending perforated boss or hub $c^2$, of conical form, or gradually diminishing in diameter toward its inner end. A coiled spring, D', of conical form, is secured about each rod B'. It is fastened at one end to a pin, $d$, fixed to the rod, and at the other or free end $d'$ bears against the top of the bracket. The springs are located in the spaces C' of the brackets, and the tapering hubs $c^2$ of the brackets extend partially through the coils of the springs, as indicated by dotted lines. In this way not only are desirable long bearings provided at the outer ends of the brackets without interfering with the springs, but the hubs aid in keeping the springs in shape and under proper tension and lessen wear of the springs. An inwardly-inclined lug or short arm, D², projects laterally from the lower portion or base of each bracket at its heel end, and bracket-controlling rollers $d^2$ are mounted at the outer ends of these arms D² upon stud-shafts projecting inwardly therefrom. The springs D' act with a tendency to hold the rake-teeth rocked upward, or else to rock them upward from their vertical or raking position. The swing of a bracket in the direction it is rocked by its spring is limited by a stop-shoulder, $d^3$, at the heel of the bracket acting in connection with the before-described stop-projection $a^2$. Outward movement of a bracket along its rod B' is prevented by a cross-pin, $c^3$.

Each rake-arm has its oscillating bracket adjustably secured to it, for a well-known purpose, as follows: The bracket is held with the back of its base against its rake-arm by means of bolts $e$ $e'$ and their nuts, aided by an inclined brace, E, pivoted at one end to the top outer corner of the bracket by a bolt, $e^2$, and nut, and having a slot, E', at its opposite end, through which slot, as well as through the rake-arm, a bolt, E², provided with an adjusting-nut, passes. As the bolt $e'$ passes through a slot in the bracket-base it is obvious that by loosening the nuts of the bolts $e'$ E² the bracket may be rocked vertically about the inner bolt, $e$, to a limited but sufficient extent for all needed adjustment, and then rigidly connected with its rake-arm D by tightening the nuts of the bolts.

The cam for directing the movements of the rakes and causing oscillation of their brackets consists in part of the top plate, F, inside of or between the rake-carrying arms, and is otherwise formed and supported as follows: A front projection or forwardly-extending arm, G', of the overhanging top or head G of the rake-post serves to support a foot or flanged base portion, $f$, of a rigidly but removably mounted front section, F', of the cam. This cam-section extends around toward the platform and terminates about in the vertical plane of the finger-beam or front edge of the platform. A bolt, $f'$, and nut serve to connect the foot $f$ with the arm G', and this front cam-section is further secured to the rake-post head by means of a second foot, $f^2$, provided with a flange underlapping the rake-post head, and secured thereto by a bolt and nut, $f^2$. Between its feet $f$ $f^2$ the front cam-section is recessed or hollowed out, to receive a casing inclosing the mechanism for automatically controlling the rakes, as in turn to be described. The casting constituting the fixed cam-section F' is formed with a wedge-shaped cam-rail, $f^3$, and a cam-track, $F^3$, which extends farther inward than the rail. The point of the cam-rail is at its inner end, or that next the inward extension of the track $F^3$. The rail projects from the track, as clearly shown by the drawings. From its point the rail extends with the cam-track to the heel or termination of the front cam-section over the finger-beam. A movable switch section or gate, $G^2$, of the cam is jointed at its heel end to the heel end of the front cam-section by a pivot, $g$. This switch rocks vertically, and when closed bridges the space between the front cam-section and another fixed section or side track, $G^3$, of the cam, which in this instance is formed by being cast with the head of the rake-post. An abruptly-curved or steeply-inclined fixedly but detachably supported track or cam-section, H, is secured by its flanged base or foot H' to a rearward projection or arm, $h$, of the rake-post head. This arm is flanged at its edges so as to form a seat or socket recess in which the foot H' fits. A bolt and its nut $h'$ complete the attachment. There is an open space at $H^2$, between the sections $G^3$ and H of the cam, and in this way the continuity of the cam-track is broken. The inner side of the rake-post head, from the rear cam-section to the front cam-section is unprovided with a cam-track.

The cam-switch $G^2$ at its heel is formed with or has rigidly attached to it a down-hanging locking-arm, $g'$, which has a side projection or hook, $g^2$, at its lower end to act in connection with a shoulder or hook, $i$, at the nose end of a vertically-rocking lever, I, to dog and release the cam-switch. The nose of this switch dogging and releasing lever is inclined, and the lever is pivotally supported at its heel end, and its play is suitably limited, as farther on to be fully described. A controlling-arm, I', projects from about midway the length of this lever, and extends downwardly, forwardly, and inwardly. An eye, $i'$, at the end of the arm I' serves to attach one end of a treadle-actuated pull-and-thrust rod, $I^2$, partly shown by dotted lines. This rod, at its opposite end, connects with suitable treadle mechanism—such, preferably, as shown in the before-recited Patent No. 263,383—so that the driver of the machine, by actuating the treadle so as to pull on the rod $I^2$, can hold the nose of the lever I down and free from the locking-arm of the cam-switch, and can also, by exerting a thrusting-strain on the rod, elevate the nose of the lever to cause engagement of its hook with the hook of the locking-arm $g'$.

Figure 1:
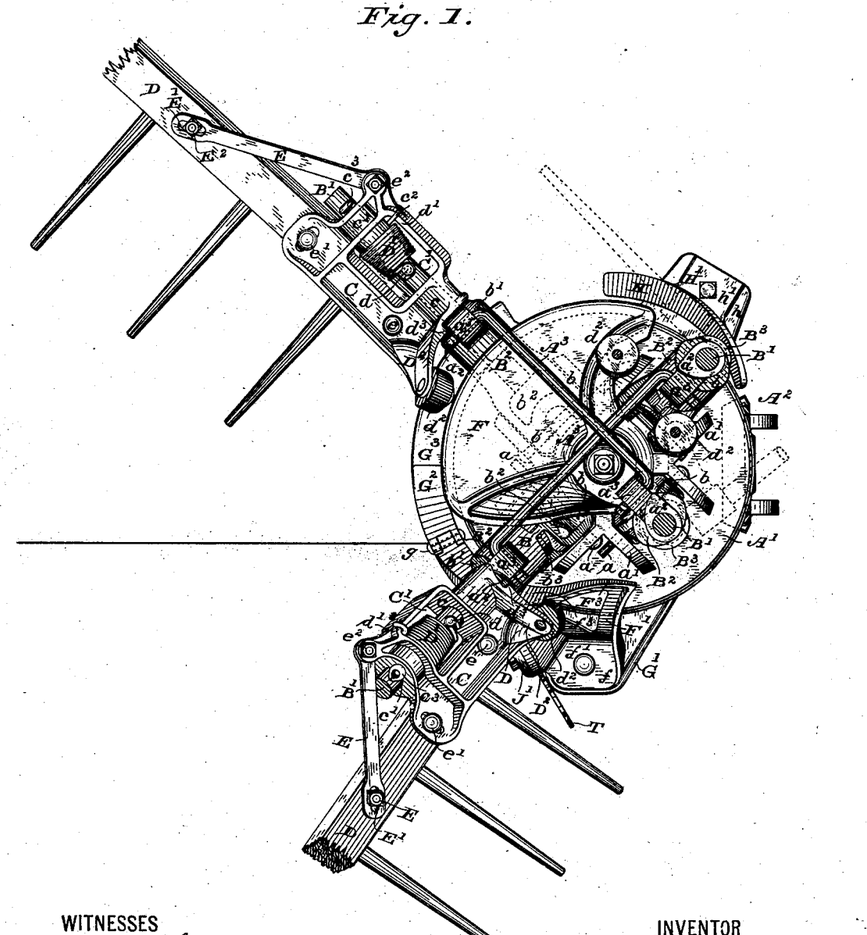
Figure 1 is a plan or top view, with parts in section, and other parts shown by dotted lines.
Figure 2:
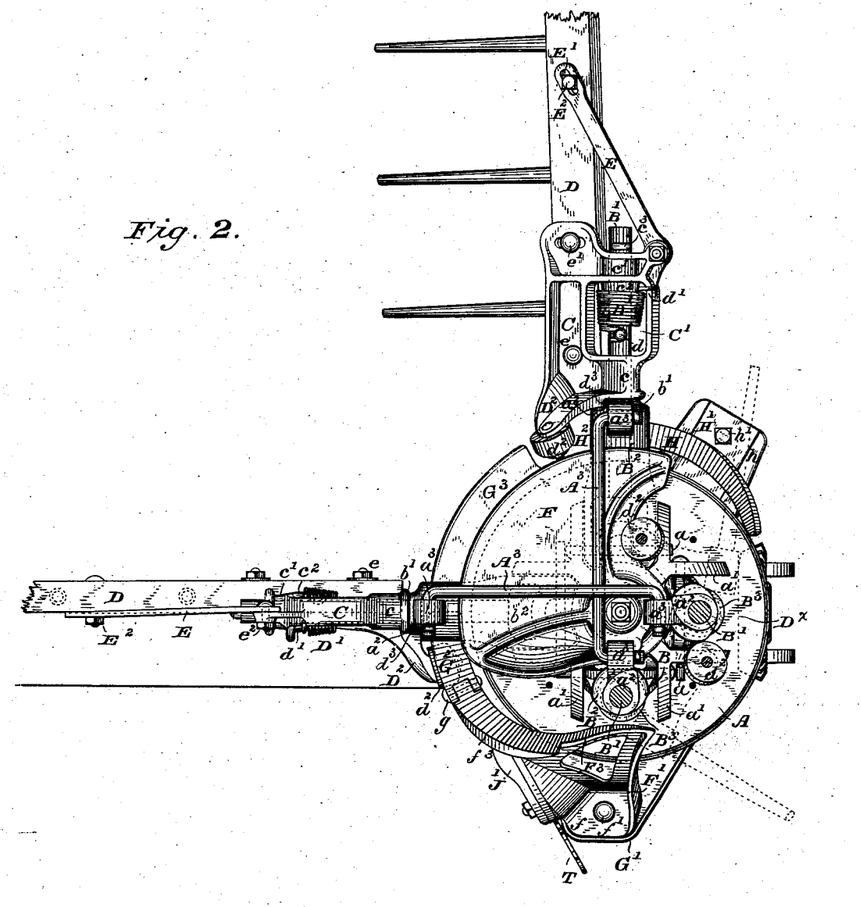
Fig. 2 is a view similar to that represented by Fig. 1, except that parts are shown as occupying different positions.

The operation of the raking and reeling mechanism so far as it has been above explained, and starting, for convenience of description of the operation, with the rake-head, which is lettered $D^\times$ in Fig. 3, and has its carrying-arm correspondingly lettered in Fig. 2, is as follows: In passing to the front cam-section the rake is held up by its link-connection with its fellow, and when, or shortly after, said front section is reached by the rake, the roller $B^3$ of the carrying-arm travels along the inner surface of the cam-track $F^3$. When the bracket-controlling roller $d^2$ is presented to the point of the cam-rail $f^3$, it is caused to pass outside of and beneath this rail. Because of its wedge shape the cam-rail depresses the roller $d^2$, and causes the bracket C to rock against the force of its spring, to gradually swing down the rake-teeth, so that by or somewhat before the time the bracket-roller reaches the lower or heel end of the cam-rail the rake-teeth will have been brought into their vertical or raking position. The carrying-arm roller, traveling in advance of the bracket-roller, passes over the cam-switch $G^2$ (whether the switch be locked or not) in time to clear the switch shortly after the bracket-roller is presented to its heel end. If the switch is unlocked, the spring D' acts and swings up the bracket, elevating the rake-teeth and causing the bracket-roller to lift the cam-switch and pass above the track of the side section, $G^3$, of the cam. The roller $B^3$ travels along or in contact with the upper surface of the side track, $G^3$, after leaving the switch I; but the roller $d^2$, in passing upward, is elevated above the level of the side track, so as to move around, over, or clear of it. Should the switch be locked upon the presentation thereto of the roller $d^2$, this roller travels along beneath the side track and bears against its under surface, thus holding the rake-teeth down to sweep off the grain on the platform. After a raking action the teeth are swung up by the spring actuation of the bracket, when its roller is released at the rear end of the side track. When so released, the roller rocks up through the space $H^2$. The carrying-arm roller $B^3$ does not pass from the side track until the opposite or link-connected carrying-arm and its roller have entered between the front track and the inner front corner of the inside cam, F, and so, while the space $H^2$ is being crossed, the rake is positively controlled or directed in its movement. After crossing this space the roller B³ rides upon and up the track of the rear cam-section, H, and from the time the roller leaves this rear track until it comes to the front track the rake-arm is held up by the link-connection with its fellow.

The setting mechanism for automatically controlling the rake is as follows: A suitably-supported casing, J, provided with a removable recessed cover or face plate, J', shown bolted thereto, is in this instance secured in the space formed by the recess in the front section or casting, F', of the cam. A screw or bolt, j, serves to connect a top flange or rib, j', of the casing with a downwardly-projecting flange at the top of the opening or recess in the cam-casting. The upper portion of the casing corresponds in outline with the shape of the opening in which it fits, so that the one fastening-bolt serves to securely hold the casing in place. The cover allows ready access to the protected mechanism.

Figure 6:
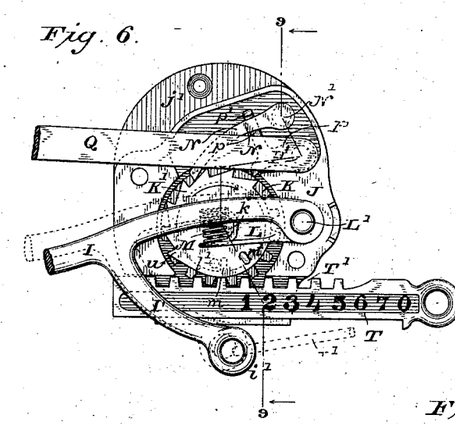
Fig. 6 is a side elevation, the casing-cover or face-plate being removed, the pawl-tripping rod omitted, and parts broken away.

A segment-gear, partially-toothed disk or mutilated pinion, K, and a peripherally-flanged annularly-recessed and partially-toothed ratchet wheel or disk K' are mounted side by side upon a stud, k, projecting from the casing-back, and so as to turn thereon independently. A coiled spring, l, in the annular cavity formed in the inner face of the ratchet-wheel, between its hub k' and flange k², is fastened at one end to the ratchet-hub, and at its opposite end is connected with the mutilated pinion by being secured to a lug, l', on the inner face thereof, or is in other suitable way connected therewith. The ratchet-teeth in this instance are seven in number, and extend about half-way or a little less than half-way around its flanged periphery, and there are eight teeth on the disk K. A lug, m, on the inner face of the ratchet projects inwardly from its peripheral flange. The tendency of the spring l is to rotate the ratchet and pinion about their stud in opposite directions when the lugs l' and m are separated, so as to bring these lugs together and to hold the lugs in contact when brought together. As the pinion is locked against being turned by the spring, as soon to be explained, the spring can act only on the ratchet and to rotate it in the direction indicated by the arrows in Figs. 6 and 7, or else to hold its internal lug against the lug of the pinion. A lug, m', is provided on the outer surface of the ratchet, near its periphery and at a point intermediate the first and last teeth of the ratchet. This lug m', when brought into proper position, acts upon a loosely-mounted spring-actuated arm, L, to elevate it and lift the before-described switch locking and tripping lever I. The pivot stud L' for the heel of this lever projects inward from the casing-back, and serves also to mount the arm L at its heel. A coiled spring, M, bears at one end upon the outer end of the arm, and is prevented from displacement by a lug, n, on the arm. At its opposite end the spring enters a recess or seat in the tripping-lever I. This spring acts with a tendency to force apart the lever and arm. A laterally-projecting lug, n', on the arm overlaps a side rib, n², on the lever, and serves to hold the arm against undue downward movement when the lifter-lug m' is not acting to force it up, so as to compress the spring M, elevate the lever I, and yieldingly hold its nose in position to engage the locking-arm g' of the cam-switch. The rocking movement of the tripping-lever I is confined within proper limits by the top and bottom terminations or shoulders of an opening or slot, R, Fig. 9, in the casing-cover J', or in other equivalent and suitable way. The lever crosses the ratchet close to the outer face thereof.

Figure 4:
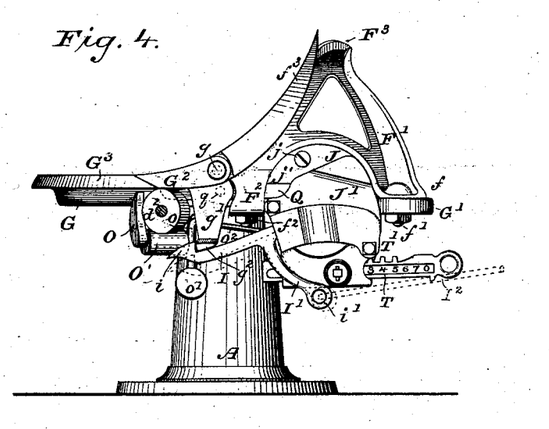
Fig. 4 is a side elevation without the rake, showing the rake-post, cam, rake-controlling mechanism, &c., with the roller of one of the rake-head brackets in the position it occupies when the teeth of said rake-head are held down at the commencement of their action on the cut grain, with the movable section or gate of the cam-track locked, and just before this roller actuates mechanism for unlocking the cam-gate, to allow of the teeth of the following rake-head turning up as the roller of its spring-actuated oscillating supporting-bracket swings up through the cam-gate.
Figure 5:
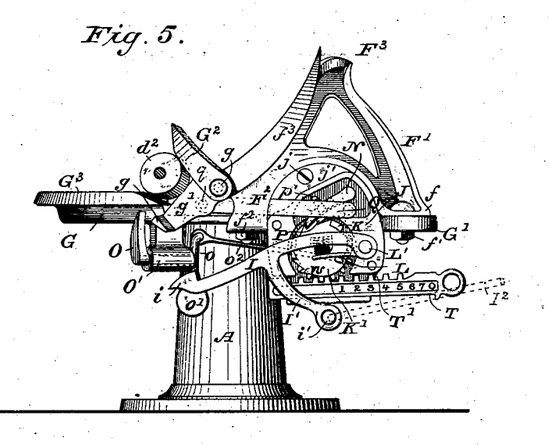
Fig. 5 is a view in side elevation, showing parts represented by Fig. 4; but with some of them in positions different from those in which they are shown in said figure, and with the face-plate or cover of the casing in which the mechanism for automatically controlling the rakes is inclosed removed to show said mechanism.

A dog, N, for acting on the ratchet-teeth to hold the ratchet against being oscillated by its spring, and for freeing the ratchet so that it may be actuated by its spring, is secured at its heel to an automatically-actuated pivot-arm or short rock-shaft, N', projecting through a bearing opening in the casing-back. The dog rock-shaft is oscillated by the automatically-imparted vibrations of an arm or lever, N², and in this instance is formed by the bent upper end or crank of this arm. (See Figs. 8 and 9, also dotted lines in Fig. 7.) The arm N² is automatically vibrated at each raking action of the rake-arms so as to trip the dog and free the ratchet, in this instance by means as follows: A trip-lug or short rocking arm, O, Figs. 4 and 5, is fixed to one end of a rock-shaft mounted in a suitable pendent bearing, O', supported beneath the front end of the side track, G³, of the cam. This bearing is attached to the rake-post head, or is cast therewith. An upwardly-projecting crank, o, is formed with or fixed to the end of the rock-shaft opposite that to which the trip-lug is fixed. A down-hanging weight, o', is also provided at the cranked end of the rock-shaft, so as to normally hold the trip-lug in a vertical position, as shown. A rod, o², serves to link together the crank o and the lower end of the vibrating rod N².

A pawl, P, automatically operated to act on the ratchet, is caused to turn it at each actuation a distance equal to that between the bases of the two adjacent teeth, and is tripped to free the ratchet at the same time that the dog N is tripped. This pawl rocks vertically about its heel-pivot P', (see Figs. 6 and 7,) and is lifted to trip it by connection with the dog N. This connection, as shown, consists of the upwardly-projecting arm p of the pawl, which passes behind and above the dog, and is provided with the lug p', overhanging the dog. When the parts are in their normal positions, this lug p' projects across the dog slightly above it, but sufficiently far from it to allow the dog to rock upward without striking the lug, as the dog-nose slides over the ratchet-teeth. The pawl P is automatically operated to feed the ratchet around tooth by tooth at each actuation of the cam-switch with which it has connection. As shown, this connection consists of a reciprocating bar, Q, at the rear end of which the pawl is mounted by its pivot-stud P', projecting from the bar. At its front end the reciprocating bar is jointed to the locking-arm g' of the cam-switch, as indicated by dotted lines at q in Figs. 4 and 5.

Figure 9:
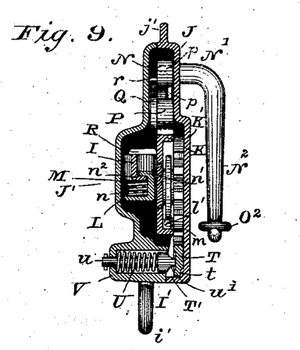
Fig. 9 is a view partly in front elevation and partly in section on the lines 9 9 of Figs. 6 and 7.

The casing-cover J' is provided with a slot or opening, r, Fig. 9, for the bar Q, and this bar also passes through a guideway opening in the foot F² of the cam-casting F'. Accidental injurious vertical movement of the heel end of the bar is in this way prevented.

Suitable means for adjusting or setting the rake-controlling mechanism by turning the mutilated pinion K and locking it in its adjusted position are provided. Various devices may be employed for this purpose; but the mechanism deemed preferable consists of a rack-bar, T, adapted to be reciprocated by hand in a guideway, T', at the bottom of the casing J. The teeth of the sliding rack-bar correspond in number with those of the pinion K, with which the rack engages. The guideway for the rack is provided at its lower inner edge with two or more lugs, $t$, for engagement with corresponding recesses, $t$, extending lengthwise of the rack-bar along the back and lower edge thereof. The guideway for the rack-bar is made wider at bottom than at top, so that this bar may be inclined by moving its lower edge outward to free it from the locking-lugs $t$, while its top or toothed edge will be held beneath or in engagement with the pinion K. The rack-bar is acted upon by a spring, U, in such manner that it is held against the back of the guideway in locked position, or else it is acted upon by the spring with a tendency to force it back against the rear face of the guideway and into its locked position. This spring is coiled about the stem of a headed rod, $u$, which passes through a tubular stud, V, of the casing-cover J'. The spring is compressed in the tubular stud between the rod-head $u'$ and the end of the stud, and presses the head out against the rack-bar to yieldingly hold the bar in its locked position.

The rack-bar T is made to serve as an indicator to show the set or condition of the rake-controlling mechanism, that the intervals between the raking actions of the rake-heads may be seen at a glance. As the controlling mechanism is in this instance organized for setting the rake-heads for action so that no one of them will rake automatically, or so that each head will act as a rake, or so that there will be a raking action for every second, third, fourth, fifth, sixth, or seventh passage of a rake over the platform, the rack-bar is provided with the figures 1 to 7, inclusive, and with a cipher or figure, 0, as shown, the cipher being closest to the outer end or handle of the bar, the Fig. 7 next, and the other figures being arranged in regular order with the lowest (1) next the inner end of the bar. The innermost figure exposed to view indicates the set of the mechanism. In the drawings (see particularly Fig. 4) the controlling mechanism is adjusted to cause every third rake to act—that is to say, to sweep off a gavel at every third passage of a rake-head over the platform. As there are in this instance four rake-heads, it follows that a raking action can be caused to take place either at every fourth of a revolution of the rake-carrier, or at any additional fourth revolution of the carrier up to and including one and three-fourths revolution. In the latter event the indicator would show that every seventh rake-head acted as a rake, and in the former that every rake-head served as a rake.

Figures 7, 10, 11, 12, 13:
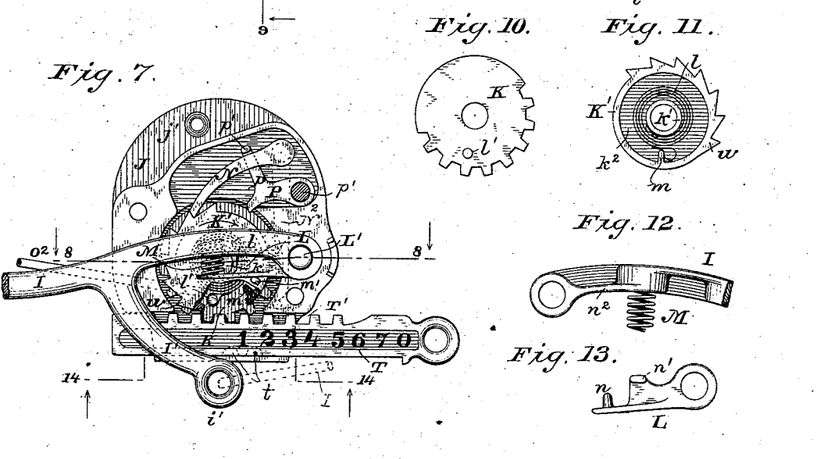
Fig. 7 is a view generally similar to Fig. 6, with some parts in section, the pawl-tripping rod in place, the reciprocating pawl-actuating bar omitted, and showing the spring-connection between the ratchet and toothed disk of the controlling mechanism.
Figs. 10 and 11 are views in elevation of the ratchet and the toothed disk, respectively, showing their adjacent or inner faces, or those which in operation come next each other.
Figs. 12 and 13, respectively, are views in elevation of a portion of a tripping-lever and of the loosely-connected spring-actuated lifting-arm thereof.
Figures 8, 14, 15:
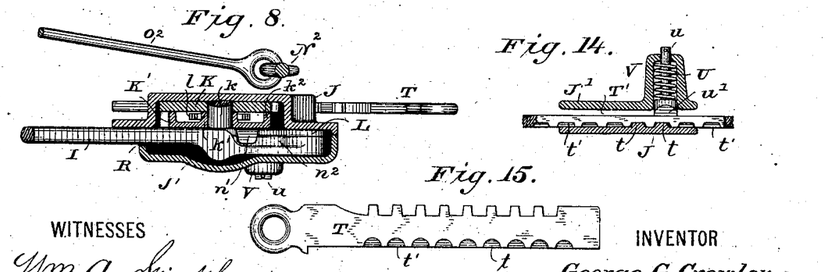
Fig. 8 is a view partly in plan and partly in section on the line 8 8 of Fig. 7.
Fig. 14 is a view, as seen from below, partly in section, on the line 14 14 of Fig. 7, showing the setting-bar and indicator of the rake-controlling mechanism, and the manner of supporting it and holding it in its adjusted position.
Fig. 15 shows the setting-bar and indicator detached, and as seen from its inner side.

In adjusting the mechanism to automatically control the raking, assuming that the rack-bar is set at zero, so that the dog N will rest on the untoothed portion of the ratchet, close to the end tooth, $w$, and the rake-heads be thus set for reeling only, unless thrown into raking action by the driver, as before described, the rack-bar, after being tilted to unlock it, is moved to turn the pinion K to the desired extent—say, until 3 is the last figure exposed, as shown by the drawings. When the parts are so set, the ratchet moves from a position in which its lug $m'$ is remote from the arm L into a position such as that shown by Fig. 6, bringing the ratchet-lug $m'$ much nearer this arm. The dog at this time rests between the third and fourth teeth of the ratchet, counting from the end opposite that at which is the tooth $w$. The rake-arms now automatically operate the reciprocating bar Q by the successive liftings of the cam-switch by the bracket-rollers $d^2$, thus separating the lug $m$ from the pinion-lug $l'$ and presenting the outside ratchet-lug, $m'$, to the lifting-arm L and raising the switch dogging and tripping lever into the position in which it is shown in full lines in Figs. 4 and 7 and in dotted lines in Fig. 6. The first actuation of the pawl P by the reciprocation of its bar Q brings the ratchet into the position in which it is shown in Fig. 5. The second actuation of the pawl moves the ratchet into the position in which it is shown by Fig. 7, thus causing the elevation of the lever-nose, so that upon the downward swing of the switch-locking arm, when the switch is released by a bracket-roller, $d^2$, its lug $g^2$ will ride along the inclined nose of the lever, depressing it, and becoming engaged with the shoulder $i$ of the lever. The roller $d^2$ of the next rake-arm (the third) will be held down beneath the locked switch, so that a raking action will result, unless the driver should pull on the lever-arm I' to release the switch-locking arm by depressing the nose of the lever. When the roller $d^2$ of a rake-arm passes beneath the locked switch, the trip-lug O is struck by the roller and rocked to lift or trip the dog N, thus leaving the ratchet free to be acted upon by its spring, so that the mechanism is automatically reset by the backward movement of the ratchet to bring its lug $m$ against the lug of the pinion. Should the driver desire to hasten the raking action, he can throw in a rake in advance of its turn by lifting the tripping-lever I to dog the switch. Whether a thrown-in rake be caused to act in advance or after its turn of regular automatic action, the actuation of the pawl-tripping mechanism will cause the resetting of the controlling mechanism and insure that the subsequent automatic action of a rake will take place regularly—that is, the third rake after the intervening or thrown-in rake will work automatically. While automatic action is delayed the pawl works on the untoothed part of the ratchet, and so the first roller, $d^2$, reaching the switch after the lever I is released by the driver, causes a raking action. Whether the indicator be set at 2 or 7 or at any intervening number, the action of the rake-head next preceding that which is to rake adjusts the tripping-lever to its switch-dogging position by causing the outside lug of the ratchet to press up the lifting-arm of the lever and yieldingly hold the lever in its elevated position for automatic engagement with the locking-arm of the cam-switch. When the indicator is set at 7, the lug $m'$ is constantly held up to the lever-sustaining lifting-arm, to keep the cam-switch dogged by the lever, unless it is actuated by the driver to prevent a rake-head from raking.

The set of the controlling mechanism may be changed at any time simply by sliding the indicator and rack-bar and tripping the dog N by hand, if necessary, as when the indicator is set to a higher number, so as to throw the rakes into action less frequently than before.

It will be seen that the number of rake-heads may be varied, as desired. Were six instead of four heads employed, the intervals between the actions of rakes would be proportionately shortened with a given adjustment of the controlling mechanism. My invention may otherwise be modified in various ways. For instance, a rocking segment-gear or a pinion might be employed for engagement with and adjustment of the mutilated pinion instead of the rack-bar, and such adjusting device be provided with a crank-arm projecting through and working in a curved slot at the casing-back, and provided with any suitable and well-known form of securing mechanism to lock the device in its adjusted position. The indicator-figures might be placed on the casing at the edge of said slot, so that the position of the crank-arm relatively to them would show the set of the mechanism; or these figures might be on the mutilated pinion and be read through an opening in the casing. It is further obvious that a worm-shaft might be substituted for the rack-bar and engage a worm-gear employed in place of the mutilated pinion, in this instance shown. As sundry other of the details of my improvements may be modified in various ways without departing from my invention, I do not wish to be understood as confining my invention to the precise constructions of parts or specific arrangements of devices herein particularly described.

I claim as my own invention—

1. The combination of the rake-carrying arm, the centrally-open oscillating bracket having the bearing-perforations at its opposite ends, the rod of the rake-carrying arm about which the bracket oscillates, the conical coiled spring having connection at one end with the rod and bearing against the bracket at its opposite end, and the conical hub of the bracket projecting into said spring, substantially as and for the purpose hereinbefore set forth.

2. The combination of the rake-post head, and the front section of the cam provided with the feet by which it is connected with the rake-post head, and recessed between its feet, substantially as and for the purpose hereinbefore set forth.

3. The combination of the rake-post head, the forwardly-extending arm thereof, the front section of the cam, its foot secured to said arm, and its foot underlapping the rake-post head and secured thereto, substantially as and for the purpose hereinbefore set forth.

4. The combination of the rake-post head, its rearwardly-projecting arm, the steeply-inclined rear cam-section secured thereto, the front cam-section, and the switch pivoted to it, as and for the purpose described.

5. The combination of the inside cam-section, the steeply-inclined rear cam-section, the front cam-section with its wedge-like rail, the rake-carrying arms linked in pairs, and the rotary rake-carrier, substantially as and for the purpose hereinbefore set forth.

6. The combination, substantially as hereinbefore set forth, of the rake-post, the inside cam-section, the front cam-section, the switch, the side cam-section, and the rear cam-section having the space between it and the side section, for the purpose described.

7. The combination, substantially as hereinbefore set forth, of the rake-post, the rotary rake-carrier, the rake-carryings arms, the spring-actuated oscillating brackets, their inwardly-inclined roller-carrying arms, the rake-arms linked in pairs and to which the brackets are secured, the inside cam-section, the front cam-section having the cam-track and wedge-like cam-rail, the switch, means for locking and releasing it, the side cam-section, and the rear cam-section having a space between it and the side section, for the purpose described.

8. The combination of the cam-casting or front section having the recess, and the rake-controlling mechanism secured in said recess, substantially as hereinbefore set forth.

9. The combination of the cam-switch, mechanism connected therewith for automatically controlling the rakes, the supporting and protecting casing, and the removable face-plate of the casing, substantially as hereinbefore set forth.

10. The combination, substantially as hereinbefore set forth, of the series of rake-arms acting either simply to reel or both to reel and rake, the movable cam-switch actuated by the non-raking arms, the tripping-lever for dogging and releasing the switch, automatically-operating adjustable rake-controlling mechanism actuating the tripping-lever, mechanism connected with and actuated by the movements of the switch for operating the controlling mechanism to adjust the tripping-lever to its dogging position, and mechanism connected with the controlling mechanism and actuated by the raking-arms for resetting the controlling mechanism at each raking action.

11. The combination, substantially as hereinbefore set forth, of the series of rake-arms acting either simply to reel or both to reel and rake, the cam-switch to which movement is imparted by the non-raking arms, the tripping-lever for dogging and releasing the switch, automatically - operating rake - controlling mechanism actuating the tripping-lever, mechanism connected with and actuated by the movements of the switch for operating the controlling mechanism to adjust the tripping-lever to its dogging position, mechanism connected with the controlling mechanism and actuated by the raking-arms for resetting the controlling mechanism at each raking action, and means by which to hasten or retard the raking action by throwing in a rake out of turn.

12. The combination, substantially as hereinbefore set forth, of the combined rake and reel arms, their oscillating brackets, the bracket-rollers, the cam-switch moved by the passage of said rollers when the rake-arms act merely to reel, the tripping-lever, automatically - operating rake - controlling mechanism actuating the tripping-lever, mechanism connected with and actuated by the movements of the switch for operating the controlling mechanism to adjust the tripping - lever for locking the switch and causing the raking action of the rake-arms by the travel of their bracket-rollers beneath the switch, mechanism connected with the controlling mechanism and actuated by the bracket-rollers of the raking-arms for resetting the controlling mechanism at each raking action, and the rod for actuating the tripping-lever by either thrusting or pulling strains to hasten or retard the raking action.

13. The combination, substantially as hereinbefore set forth, of the cam-switch, the tripping-lever, the ratchet of the rake-controlling mechanism, the ratchet - spring, means by which to limit the movement imparted to the ratchet by the action of its spring, means for actuating the ratchet by the rake-arms when acting simply to reel, the pivoted arm actuated by the ratchet for lifting the tripping-lever to dog the cam-switch, and means actuated by the rake-arms when raking to release the ratchet for actuation by its spring, for the purpose described.

14. The combination of the cam-switch, the tripping - lever, the ratchet, its spring, the ratchet-actuating pawl, means connected with the switch for operating the pawl, the dog acting on the ratchet, the lug on the outer face of the ratchet, the arm actuated by the lug for lifting the tripping-lever, and tripping mechanism actuated by a raking-arm for freeing the ratchet from the dog and pawl, substantially as and for the purpose hereinbefore set forth.

15. The combination, substantially as hereinbefore set forth, of the spring-connected pinion and ratchet provided with the inner lugs, the rocking dog, the reciprocating pawl, the tripping-lever, the vibrating arm to which the dog is secured, means for actuating said arm at each raking action to trip the dog, and the trip-connection between the dog and pawl, for the purpose described.

16. The combination of the reciprocating pawl-carrying bar, the cam-switch with which it is connected, the pawl, and the ratchet of the rake-controlling mechanism, substantially as and for the purpose hereinbefore set forth.

17. The combination of the ratchet of the rake-controlling mechanism, the rocking dog, the vibrating arm with which the dog is connected, and the trip-lug connected with said arm and actuated at each raking action to cause the dog to release the ratchet, substantially as and for the purpose hereinbefore set forth.

18. The combination of the ratchet, the dog, the pawl, its arm provided with the lug overhanging the dog, the trip-lug actuating at each raking action, and means connecting it with the dog, substantially as and for the purpose hereinbefore set forth.

19. The combination, substantially as hereinbefore set forth, of the recessed ratchet-disk, the pinion, the fixed stud upon which the ratchet and pinion are mounted, the lug on the inner face of the ratchet, the lug on the corresponding face of the pinion, the spring connecting the ratchet and pinion, means for adjusting the ratchet and pinion and for locking the latter in position, with the inner lugs of the ratchet and pinion in contact, the cam-switch, means actuated thereby for turning the ratchet against the pressure of its spring, and by which the ratchet-lug is separated from that of the pinion, the tripping-lever, its pivot, the spring-actuated arm for lifting and yieldingly supporting the lever, and the lug on the ratchet for elevating the arm, for the purpose described.

20. The combination of the tripping-lever, its heel-pivot, the lifting-arm yieldingly supporting the tripping-lever, and means connecting the lever and arm for preventing undue downward movement of the latter, substantially as and for the purpose hereinbefore set forth.

21. The combination of the tripping-lever, the lifting-arm, the spring between the lever and arm, and the lug of the arm overlapping the side rib of the lever, substantially as and for the purpose hereinbefore set forth.

22. The combination of the casing of the rake-controlling mechanism, the reciprocating pawl-carrying bar, the pawl pivoted thereto, the dog, the ratchet, the arm of the pawl provided with the lug overhanging the dog, and means for tripping the dog and pawl to free the ratchet, substantially as and for the purpose hereinbefore set forth.

23. The combination, substantially as hereinbefore set forth, of the cam-switch, the tripping-lever for dogging and releasing the switch, the adjustable rake-controlling mechanism actuating the tripping-lever, means for setting said controlling mechanism, means for indicating its adjustment, mechanism actuated by the rake-arms when simply reeling for operating the controlling mechanism to adjust the tripping-lever to its dogging position, and mechanism actuated by the rake-arms when raking for resetting the controlling mechanism.

24. The combination of the casing, the rake-controlling mechanism, the tripping-lever actuated thereby, and the adjusting-rack and indicator, substantially as and for the purpose hereinbefore set forth.

25. The combination of the rake-controlling mechanism, the rack-bar engaging the pinion of said mechanism, and provided with the recesses, the guideway for the rack provided with lugs for engagement with the recesses of the rack-bar, and the spring-actuated rod acting upon the rack-bar, substantially as and for the purpose hereinbefore set forth.

26. The combination of the series of combined rake and reel arms, the cam, the cam-switch, the rake-actuated trip-lug, its rock-shaft, the ratchet of the rake-controlling mechanism, and the ratchet-actuating pawl and dog having connection with said rock-shaft, substantially as and for the purpose hereinbefore set forth.

27. The combination of the rake-post head, the pendent bearing attached thereto, the rock-shaft mounted in said bearing, the trip-lug at one end of the rock-shaft, the crank at the opposite end thereof, the link-rod, the vibrating rod connected by the link-rod with the crank of the rock-shaft, and the dog, substantially as and for the purpose hereinbefore set forth.

28. The combination of the rake-controlling mechanism, the tripping-lever, and the setting and indicating rack-bar engaging the pinion of the controlling mechanism for adjusting said mechanism to act upon the tripping-lever either constantly or at intervals, or not to act at all thereon, substantially as and for the purpose hereinbefore set forth.

In testimony whereof I have hereunto subscribed my name.

GEORGE G. CROWLEY.

Witnesses:
 WATTS T. LOOMIS,
 JOHN W. FITZGERALD.